United States Patent

Baukal, Jr. et al.

[11] Patent Number: 5,871,343
[45] Date of Patent: Feb. 16, 1999

[54] METHOD AND APPARATUS FOR REDUCING NOX PRODUCTION DURING AIR-OXYGEN-FUEL COMBUSTION

[75] Inventors: Charles Edward Baukal, Jr., Harleysville; Vladimir Yliy Gershtein, Allentown; James Francis Heffron, Orwigsburg; Robert C. Best, Blandon; Prince Boyd Eleazer, III, Allentown, all of Pa.

[73] Assignee: Air Products and Chemicals, Inc., Allentown, Pa.

[21] Appl. No.: 82,621

[22] Filed: May 21, 1998

[51] Int. Cl.[6] .................................................. F23M 3/04
[52] U.S. Cl. .................. 431/10; 431/8; 431/181; 431/187; 239/422
[58] Field of Search .................. 431/8, 10, 181, 431/187, 188; 239/422

[56] References Cited

U.S. PATENT DOCUMENTS

| | | |
|---|---|---|
| 4,797,087 | 1/1989 | Gitman . |
| 5,217,363 | 6/1993 | Brais et al. . |
| 5,308,239 | 5/1994 | Bazarian et al. . |
| 5,454,712 | 10/1995 | Yap . |
| 5,611,683 | 3/1997 | Baukal et al. ............................ 431/10 |

*Primary Examiner*—Carroll B. Dority
*Attorney, Agent, or Firm*—Willard Jones, II

[57] ABSTRACT

Method and apparatus for reducing NOx production during air-oxygen-fuel combustion by providing a central core of fuel surrounded by a sheath of oxygen at a combustion end of an air-oxygen-fuel burner. Diametrically opposed air passages are provided on either side of the oxygen sheath to permit entrainment of furnace gases into a flame zone created by primary combustion of fuel and oxygen. Oxygen can be introduced into each air passage to enhance combustion with low NOx emissions.

10 Claims, 5 Drawing Sheets

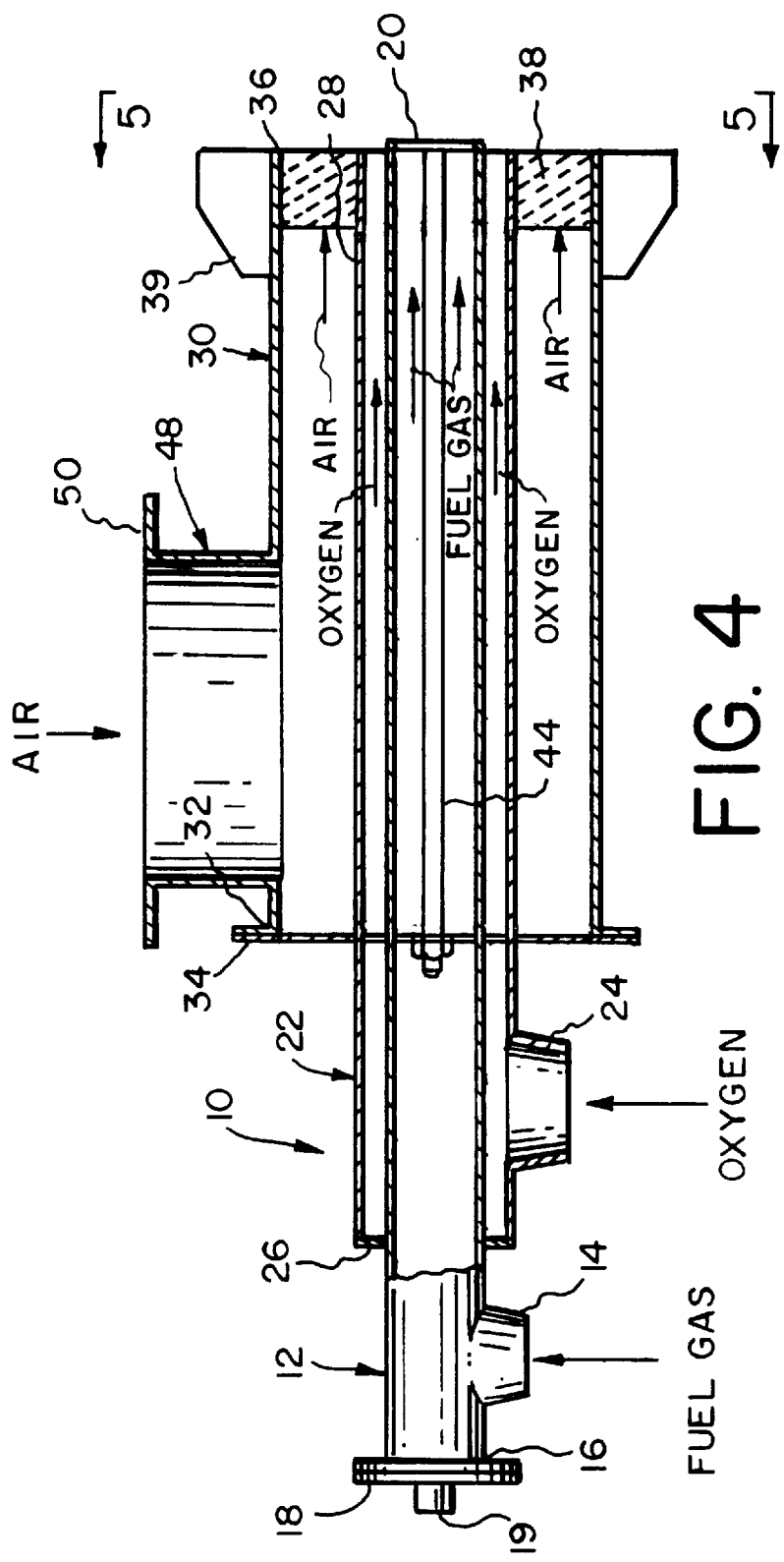

METHOD AND APPARATUS FOR REDUCING NOX PRODUCTION DURING AIR-OXYGEN-FUEL COMBUSTION

CROSS REFERENCE TO RELATED APPLICATION

Not applicable

STATEMENT REGARDING FEDERALLY SPONSORED RESEARCH OR DEVELOPMENT

Not applicable

BACKGROUND OF THE INVENTION

The present invention pertains to air-oxygen-fuel combustion processes.

A large majority of combustion processes use air as an oxidizer to combust a fuel such as natural gas, fuel oil, propane, waste oils, and other hydrocarbons and the like. Performance of many air-fuel combustion processes can be improved by enriching the combustion air with oxygen. Enrichment of the combustion air increases both the flame temperature and the thermal efficiency while the flue gas volume decreases as the oxygen concentration in the oxidizer increases. The cost of using high purity oxygen for enrichment can be offset by gains in productivity from enhanced combustion. Low level enrichment of up to 35% total oxygen content in the oxidizer can generally be applied to existing air-fuel systems with only a few modifications to the system.

It is well known that using oxygen to enhance combustion has many benefits which include increasing productivity and thermal efficiency which are both of interest in many of the high temperature heating and melting processes used in industry. However, the cost of completely replacing the combustion air with high purity oxygen is often not cost-justified, and may not be required or desirable. In those cases, it is better to use an intermediate oxygen composition which is a combination of air with high purity oxygen. It has been demonstrated that there is initially a rapid rise in the benefit as the oxygen content and the oxidizer increases up to about 60%. Above 60%, the benefits still increase with the oxygen content in the oxidizer however, at a much lower rate. Therefore, this is in effect a case of economic diminishing returns.

Air Products and Chemicals, Inc. of Allentown, Pennsylvania has introduced, under the brand name EZ-Fire, the use of both air and oxygen in combustion processes to maximize the benefit to cost ratio. However, even with these burners the problem is still one of NOx generation. NOx rises rapidly to a peak in the middle range of oxidizer compositions, and then decreases to zero when pure methane is combusted with oxidizers ranging in composition from air through mixtures of air and pure oxygen to pure oxygen since no nitrogen is present when pure oxygen is the oxidizer. The challenge to the operator when using intermediate oxygen compositions is to control the NOx emissions. Air-fuel burner manufacturers have designed new, low NOx burners which incorporate many of the known techniques for minimizing NOx formation including fuel or furnace gas recirculation, oxidizer or fuel staging, pulse combustion, and controlled delayed mixing. However, in many cases there is a reduction in thermal efficiency and productivity. There are many methods for reducing NOx after it has been formed. These methods are usually referred to as post-treatment however, this type of NOx reduction equipment is strictly an add-on cost, with no process benefit.

Solutions to the problem include a burner such as offered for sale by Air Products and Chemicals, Inc. and as disclosed in U.S. Pat. No. 5,308,239, which will increase productivity and thermal efficiency while minimizing NOx by enabling the user to retrofit the burner to existing dual-fuel air-fuel burners.

An improvement to the burner shown in the '239 patent is offered for sale by Air Products and Chemicals, Inc. and is disclosed and claimed in U.S. Pat. No. 5,611,683.

Another technique is disclosed and claimed in U.S. Pat. No. 4,797,087 wherein a core of oxygen is surrounded by a sheath of one or more fuels which are then surrounded by air. Another version of this technology has an inner core of fuel surrounded by oxygen which is surrounded by an auxiliary fuel which is then surrounded by air. The main objective of this technology is to create an inner, fuel rich pyrolizing zone to produce soot and thus a luminous flame. The outer zone is fuel lean to burn out the soot and any remaining fuel. This type of a flame has two or more reaction zones depending upon which embodiment is employed. The primary embodiment has two reaction zones; one reaction zone between the inner oxygen and fuel and one between the fuel and air to produce a highly luminous flame but at the same time also high NOx contents.

U.S. Pat. No. 5,454,712 discloses and claims an air-oxy-fuel burner where the fuel and oxygen are in the core but the air is swirled around this inner flame zone to intensify mixing. As will be detailed below this, in principal is diametrically opposed to the goal of the present invention.

U.S. Pat. No. 5,217,363 discloses and claims an air-oxy-fuel burner with fuel in the middle surrounded by oxygen, which is then surrounded by air. The core of the '363 burner has a spark ignitor so that the fuel passage is an annulus instead of being circular as in all of the Air Products burners. The '363 burners have moveable passages which are used to change the deflection angles and velocities of each gas while the prior Air Products devices all have straight passages. Lastly, the air in burner of the '363 patent is primarily used for cooling, not combustion whereas the Air Products devices employ air as an integral part of the combustion process.

BRIEF SUMMARY OF THE INVENTION

The present invention provides a method and apparatus for air-oxygen-fuel combustion to increase productivity while minimizing NOx formation. Oxy-fuel combustion takes place in a post-mix or nozzle-mix burner. Air is introduced on either side of the oxy-fuel combustion by means of specifically shaped passages to permit entrainment of furnace gases into the flame zone created by the primary combustion of fuel and oxygen. Additional oxygen can be introduced directly into each air passage to enhance combustion resulting in an overall combustion process with low NOx emissions.

In a first aspect the present invention is an air-oxygen-fuel burner comprising in combination:

a central fuel gas conduit extending from a first end having means to admit fuel to said conduit to a second end terminating in a combustion end;

an oxygen conduit disposed around said fuel conduit to define a passage for oxygen around and along said fuel conduit, said oxygen conduit having a first end proximate said first end of said fuel conduit and a second end terminating in a plane generally perpendicular to a longitudinal axis of said burner, said plane being at one of said second end of said fuel conduit and upstream of said second end of said fuel conduit;

a generally cylindrical housing disposed around said oxygen conduit and extending from a location proximate said first end of said oxygen conduit to a location proximate said combustion end of said fuel conduit to define a fluid passage between and around said oxygen conduit, means inside said generally cylindrical housing to define a pair of diametrically opposed crescent shaped passages communicating with said fluid passage between said housing and said oxygen conduit, said crescent shaped passages terminating in the same plane as said second end of said oxygen conduits;

means to introduce air into said crescent shaped passages; and means to introduce oxygen into each of said crescent shaped passages.

In another aspect the present invention is a method for reducing nitrogen oxide production during the combustion of an air-oxygen-fuel mixture comprising the steps of:

creating an oxygen-fuel flame at an exit end of a fuel supply conduit and an oxygen conduit spaced outwardly from and around said fuel supply conduit;

surrounding said oxygen-fuel flame with air, said air supplied on either side of said oxygen-fuel flame through generally crescent shaped passages spaced outwardly from an exit end of said fuel supply conduit;

introducing substantially pure oxygen into each of said crescent shaped passages; and maintaining combustion with a total oxidizer ( air+pure oxygen) content of less than 60% by volume.

BRIEF DESCRIPTION OF THE DRAWING

FIG. 4, is a schematic longitudinal cross-section of an apparatus according to the present invention.

DETAILED DESCRIPTION OF THE INVENTION

Figure 1:
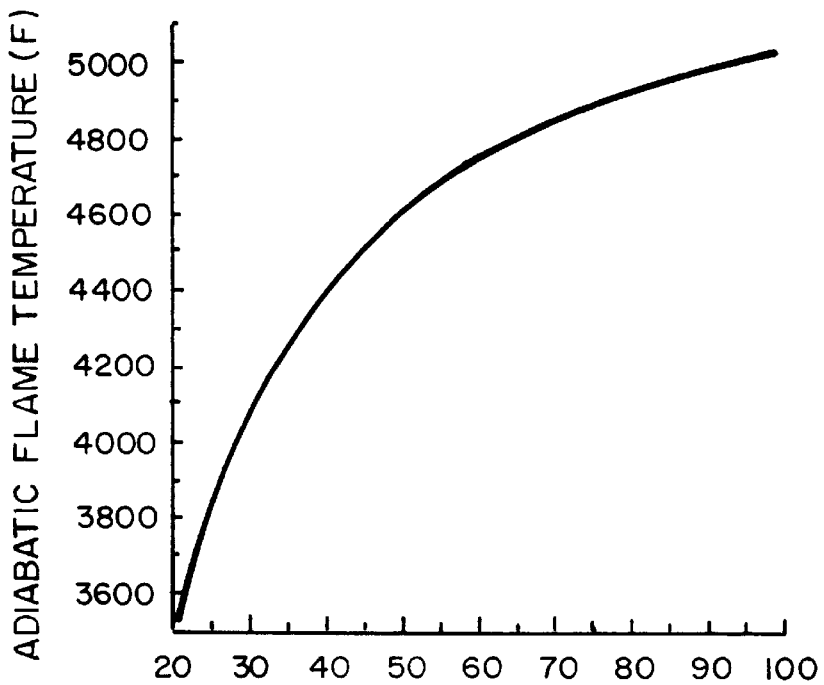
FIG. 1, is a plot of adiabatic equilibrium flame temperature as a function of the oxidizer composition (oxygen in nitrogen) for stoichiometric combustion of methane.
Figure 2:
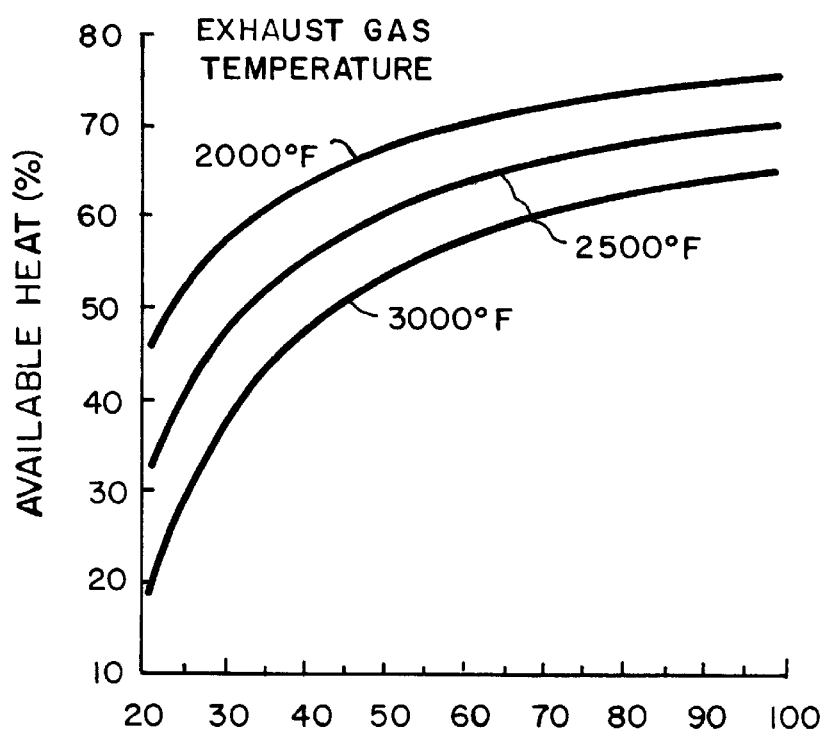
FIG. 2, is a plot of available heat as a function of the oxidizer composition (oxygen in nitrogen) and exhaust gas temperature for the stoichiometric equilibrium combustion of methane.

Referring to FIG. 1 the plotted data show that the use of oxygen to enhance combustion can increase productivity by increasing the flame temperature. As shown in FIG. 2, the thermal efficiency can be increased by increasing the amount of oxygen in the oxidizer, which is of particular interest and value in high temperature heating and melting processes. Because it is not always cost effective to completely replace combustion air with high purity oxygen and may not be required or desirable, it is better to use intermediate oxygen compositions which are produced by a combination of air and high purity oxygen. FIGS. 1 and 2 show there is an initial rapid rise in the benefit as the oxygen in the oxidizer increases up to about 60%. Above 60%, the benefits still increase with the oxidizer oxygen concentration, but at a much lower rate. Therefore, this produces an economic diminishing returns effect.

Figure 3:
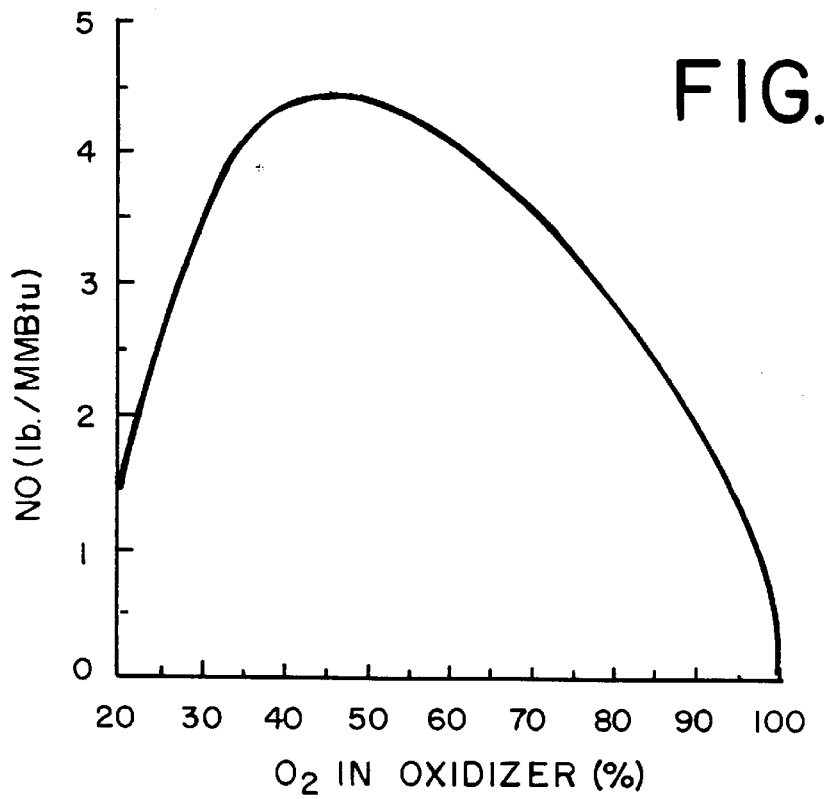
FIG. 3, is a plot of adiabatic equilibrium prediction of NOx as a function of the oxidizer composition (oxygen in nitrogen) for the stoichiometric combustion of methane.

As shown in FIG. 3, NOx rises rapidly to a peak in the middle range of the oxidizer composition and then decreases to zero when pure methane is combusted with pure oxygen since, in the latter case, no nitrogen is present. Thus, there is a need to find ways to use intermediate oxygen compositions while minimizing NOx emissions.

Thus the goal of the present invention is to economically increase thermal efficiency and productivity in combustion heating processes while minimizing NOx formation. This is particularly true in the aluminum industry where one of the primary needs is to increase production using existing furnaces, rather than building new furnaces. Another need is to improve efficiency in order to reduce the cost to produce aluminum. This is further exacerbated by the need to minimize NOx formation, which is a regulated pollutant for aluminum producers.

As discussed above two solutions were put forth by patentees in U.S. Pat. Nos. 5,308,239 and 5,611,683.

Figure 5:
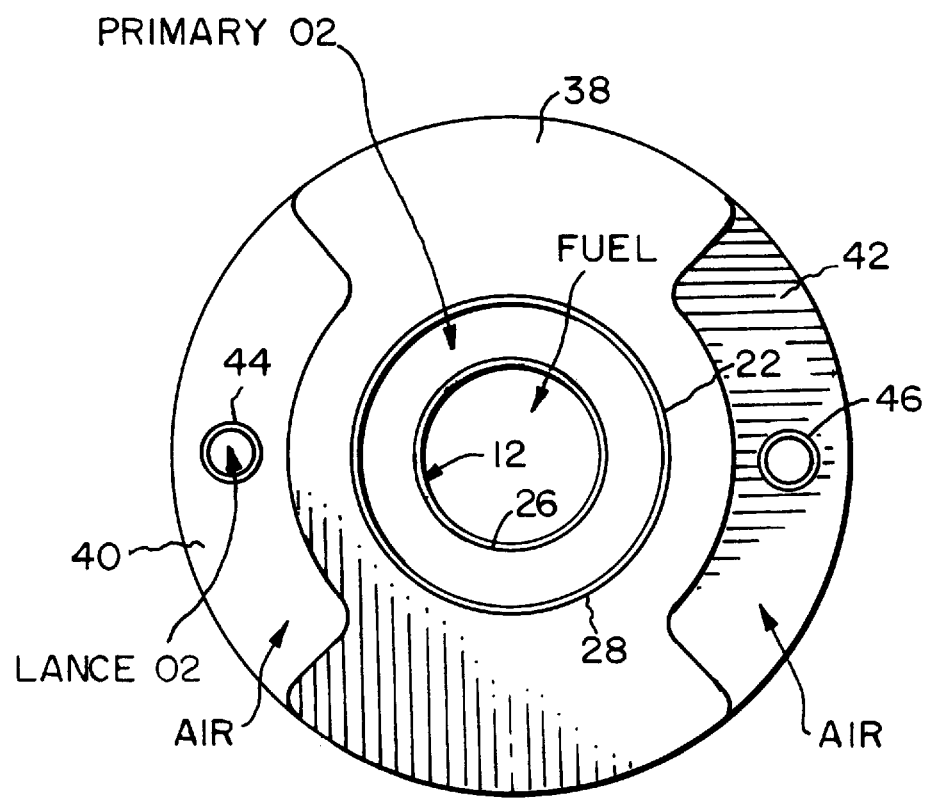
FIG. 5, is a view taken along line 5—5 of FIG. 4.

Referring to FIGS. 4 and 5 a burner 10 according to the present invention has a central fuel conduit 12, which can be connected to a source of fuel gas by a suitable fitting 14 as is well known in the art. The first end 16 of conduit 12 can be closed by a removable fluid type flange and cap arrangement 18. Flange and cap 18 can include a fitting 19 for introducing an igniter and/or UV sensor into the burner for purposes known to those skilled in the art. The second or combustion end 20 of fuel conduit 12 is adapted to produce a core of fuel. Surrounding the fuel conduit 12 is an oxygen supply conduit 22 which is disposed concentrically about the fuel conduit 12, i.e. they share a common longitudinal axis. Oxygen conduit 22 is adapted to be connected to a source of oxygen by a fitting 24 as is well known in the art. The first end of oxygen conduit 22 can be closed by a fluid tight fitted annular cap or flange 26. The second or combustion end of oxygen conduit 22 terminates in a plane which is spaced inwardly from the combustion end 20 of fuel conduit 12. The oxygen conduit 22 is in turn surrounded by a housing 30 which has a first end 32 closed by a plate or cap 34 which fits over the oxygen conduit 22. Housing 30 extends to a second end 36, which terminates at a location slightly upstream or inwardly of the combustion end 20 of fuel conduit 12. End 36 of housing 30 includes a fixture for mounting the burner in a burner block or the wall of the furnace. Disposed within the end 36 of housing 30 is a plate 38 shown in FIG. 2. Plate 38 is shaped to define two generally crescent-shaped passages 40, 42 placed diametrically opposed to each other and perpendicular to the longitudinal axis of the fuel conduit 12. Plate 38 extends to a location inwardly of the housing 30 and terminates at the exit of the oxygen conduit 28. A pair of diametrically opposed oxygen conduits 44, 46 extend along the oxygen conduit 22 and terminate in the air passages 40, 42. Oxygen conduit 44 shown in FIG. 4 can be adapted to receive oxygen from a separate oxygen supply system or the same supply system used to supply oxygen to fitting 24 and oxygen conduit 22.

Housing 30 includes an air inlet 48 which can be a generally cylindrical tube fixed to the housing 30 and terminating in a flanged opening 50 to receive air from the environment.

Burner 10 is adapted to be mounted in a burner block (not shown) for insertion into the wall of the furnace as is well known in the art.

The burner shown in FIGS. 4 and 5 has the flexibility of operating on various oxidizer-fuel mixtures, up to and including pure oxygen. Normal operation would be at about a 50–50 split where 50% of the oxygen comes from the air and 50% from the high purity oxygen supplied to the burner. The oxygen supply can be divided between the primary oxygen passage between the fuel conduit 12 and oxygen conduit 22 and the lance oxygen passages 44, 46. The oxygen enrichment of the air passages is not limited by safety concerns for oxygen cleanliness and compatibility since the oxygen is separately supplied through its own oxygen clean passages. Also, having the oxygen lance surrounded by air minimizes the speed with which nitrogen gets into the flame zone which further helps minimize NOx formation when compared to existing technologies.

According to a preferred embodiment of the invention the overall oxygen to fuel ratio should be at or near stoichiometric. The actual ratio depends on several factors. In a process which has a large amount of air infiltration, the ratio should be on the fuel rich side to minimize NOx without making too much carbon monoxide. In a process where oxidation of the product is an issue, it may be preferable to have a fuel rich ratio, even including air infiltration. Any unburned fuels, like carbon monoxide, can be post-combusted to avoid unacceptable unburned hydrocarbon emissions existing in the exhaust stack. In a process where fuel may be liberated during the heating process such as in waste incineration where hydrocarbons in the waste may be volatilized and emitted into the combustion space, the ratio may be more on the fuel lean side to provide sufficient oxidizer to burn the extra fuel, if air infiltration into the process is insufficient. In general, it is desired to run the burner as fuel rich as is practicable to minimize NOx emissions without creating a problem with carbon monoxide and combustibles emissions.

The crescent or crescent moon-shaped air passages are designed to allow furnace gas entrainment between them which dilutes the flame, reduces the flame temperature and therefore minimizes NOx formation. The specific shape of the air passage is not as important as general concepts for the air passages. Preferably, there should be as much room as possible between the passages to allow for entrainment. Fewer or larger passages are better than more smaller passages, again to maximize the area for entrainment. The amount of interface area between the air and primary oxygen passage should be minimized to avoid intense mixing and chemical reactions which would increase NOx formation. The burner and process of the present invention can be operated as an air-fuel burner or process which is the preferred method of operation during certain phases of some heating and melting processes. One such example woud be during alloying and tapping in an aluminum production furnace.

The gas velocities should be as equivalent to each other as possible to delay mixing which reduces the flame intensity and therefore reduces NOx emissions. Preferably the gas velocity should be between 30 and 300 ft/sec. To minimize NOx formation, approximately 25 to 75% of the high purity oxygen should be supplied through the oxygen lances or conduits 44, 46, with the balance supplied to the primary oxygen passage.

A burner according to the present invention was fabricated and tested in a furnace of a secondary aluminum melter over a four week period. The objective of the tests was to measure NOx emissions as a function of the burner stoichiometric ratio and oxidizer composition (air+oxygen). The overall stoichiometric ratios ranged from 1.9 (slightly fuel rich) to 11 (very fuel lean), with 2.08 representing the theoretically perfect stoichiometric ratio. The oxygen concentration in the oxidizer ranged from 21% (air) to 45% (air+pure oxygen). The tests were done under positive furnace pressures to exclude the effects of air infiltration. NOx emissions ranged from 0.031 to 1.3 lb. NO2/MMBtu with an air preheat of about 200° F. For a target design wherein the burner is operated with an overall enrichment of 35%, the NOx emission was about 0.2 lb. NO2/MMBtu which represents about a 75% reduction in NOx formation when compared to the prior art burners.

Figure 6:
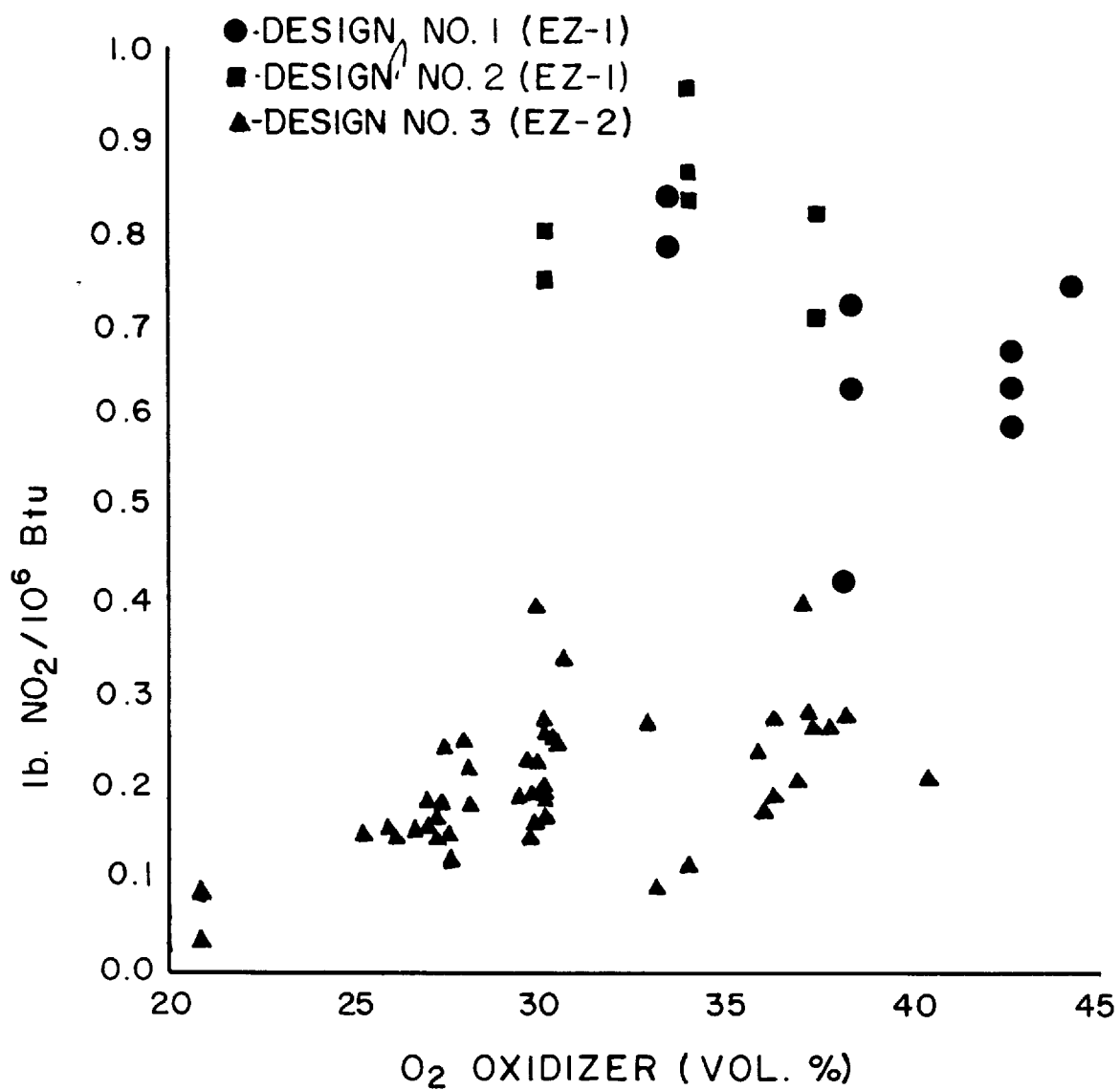
FIG. 6, is a plot of nitrogen oxide formation against oxidizer composition for two prior art burners and the burner of the present invention.

The burner tested in the furnace of the secondary aluminum melter (design number 3) was tested and compared to burners according to U.S. Pat. No. 5,308,239 (design number 1) and 5,611,683 (design number 2) with the results plotted in FIG. 6. As shown in FIG. 6, burner design number 3 (the present invention) reduced NOx formation by as much as 75% compared to the two prior art burners.

Figure 7:
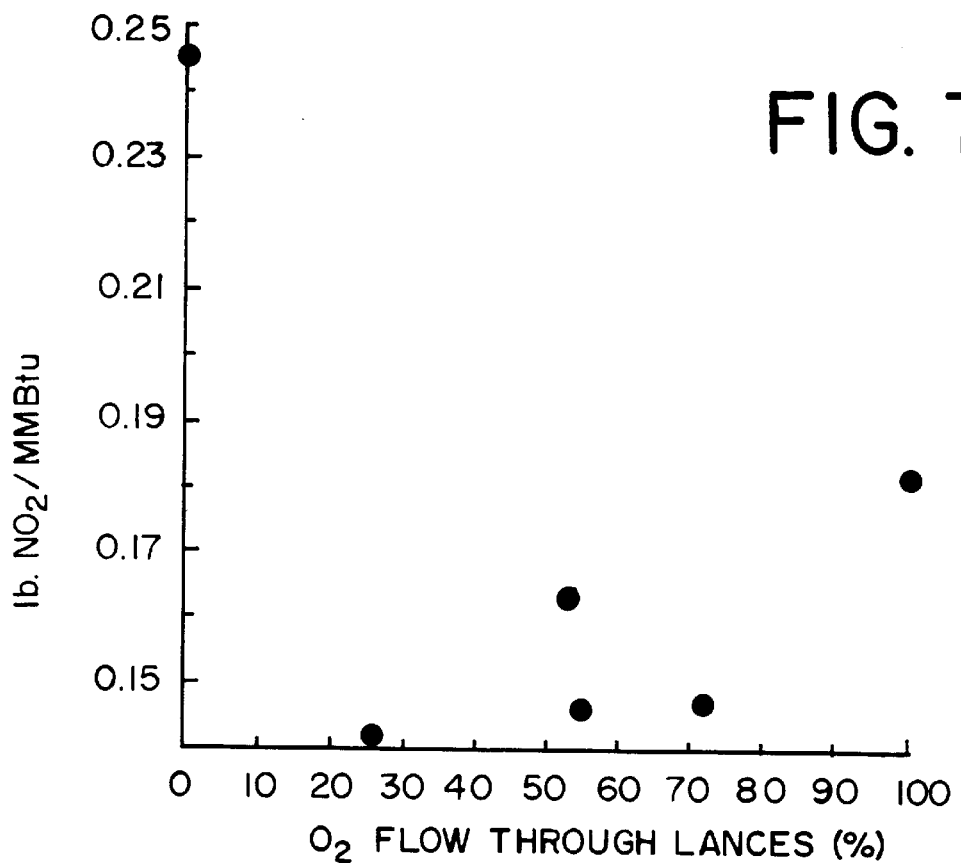
FIG. 7, is a plot of NOx formation against oxygen flow in the air passages of the burner according to the present invention.

As shown in FIG. 7, lancing of high purity oxygen through the lance oxygen passages 44, 46 located inside the air passage has a dramatic effect. As shown by the results plotted in FIG. 7 the preferred amount of lancing is between approximately 25 to 75% of the total high purity oxygen flow through the burner.

There are several important differences between the burner and the method of the present invention and the prior art discussed above. The burner according to the present invention has two distinct and highly separated, reflectionally-symmetric air passages located outside of the inner oxygen passage. The burner of the present invention is designed to entrain furnace gases into the flame region whereas no entrainment was preferable in the prior art Air Products burners. There is also oxygen enrichment of the air passages using separate oxygen injectors inside the air passage in the burner of the present invention whereas the prior art Air Products burners were designed to have air and oxygen completely separated in their own passages with the deliberate intention of slowing down or delaying the mixing between the air and oxygen streams. The burner of the present invention has two separate locations for oxygen injection. The biggest difference between the burner of the present invention and that of the prior art is the reduced production of NOx.

The lower NOx produced when using the burner of the present invention results primarily from the furnace gas entrainment into the flame zone which dilutes the oxygen concentration in the air which slows down the reaction chemistry and minimizes NOx formation. The added mass of essentially inert furnace gases which contain primarily carbon dioxide, water and nitrogen dilute the flame which reduces its temperature and thus reduces the NOx production. Lastly, separating the high purity oxygen into separate zones is a form of staging which is internal to the burner. By injecting part of the oxygen inside the air stream, the high purity oxygen is personally shielded from the flame zone by the air which again delays mixing, slows down the reactions, tends to lower the peak temperatures of the flame and thus reduces NOx formation. These same differences are apparent in regard to the other prior art which is discussed above.

Thus, the present invention achieves a method and apparatus to significantly reduce NOx formation in an air-oxygen-fuel combustion process.

Having thus described our invention what is desired to be secured by Letters Patent of the United States is set forth in the appended claims.

What is claimed:

1. An air-oxygen-fuel burner comprising in combination:

a central fuel gas conduit extending from a first end having means to admit fuel to said conduit to a second end terminating in a combustion end;

an oxygen conduit disposed around said fuel conduit to define a passage for oxygen around and along said fuel conduit, said oxygen conduit having a first end proximate said first end of said fuel conduit and a second end terminating in a plane generally perpendicular to a longitudinal axis of said burner, said plane being at one of said second end of said fuel conduit and upstream of said second end of said fuel conduit;

a generally cylindrical housing disposed around said oxygen conduit and extending from a location proximate said first end of said oxygen conduit to a location proximate said combustion end of said fuel conduit to define a fluid passage between and around said oxygen conduit, means inside said generally cylindrical housing to define a pair of diametrically opposed crescent shaped passages communicating with said fluid passage between said housing and said oxygen conduit, said crescent shaped passages terminating in the same plane as said second end of said oxygen conduits;

means to introduce air into said crescent shaped passages; and means to introduce oxygen into each of said crescent shaped passages.

2. A burner according to claim 1 wherein said means to introduce oxygen into each of said crescent shape passages comprises a conduit extending through said generally cylindrical shaped housing with a nozzle end terminating in the plane of said oxygen conduit.

3. A burner according to claim 1 wherein said means inside said housing defining said crescent shaped passages is a plate having a diameter to engage a portion of an inner diameter of said housing said plate having diametrically opposed crescent shaped cut out portions to define said openings, said plate having a central aperture adapted to fit around said oxygen conduit and to be fixed thereto.

4. A burner according to claim 1 wherein said means to introduce air into said housing is a generally cylindrical sign fixed to and communicating with the interior of said housing.

5. A burner according to claim 1 wherein said end of said housing proximate said first end of said oxygen conduit is closed by a plate disposed around said oxygen conduit and fixed thereto.

6. A burner according to claim 1 wherein said first end of said fuel gas conduit is adapted to connected to a source of fuel gas and said first end of said oxygen conduit is adapted to be connected to a source of oxygen.

7. A method for reducing nitrogen oxide production during the combustion of an air-oxygen-fuel mixture comprising the steps of:

creating an oxygen-fuel flame at an exit end of a fuel supply conduit and an oxygen conduit spaced outwardly from and around said fuel supply conduit;

surrounding said oxygen-fuel flame with air, said air supplied on either side of said oxygen-fuel flame through generally crescent shaped passages spaced outwardly from an exit end of said fuel supply conduit;

introducing substantially pure oxygen into each of said crescent shaped passages; and maintaining combustion with a total oxidizer (air+pure oxygen) content of less than 60% by volume.

8. A method according to claim 7 including maintaining said total oxidizer content between 21 and 45% by volume.

9. A method according to claim 7 including introducing between 25 and 75% by volume of total oxygen flow through said burner into said crescent shaped passages.

10. A method according to claim 8 including maintaining said total oxidizer content at about 35% by volume.

* * * * *

UNITED STATES PATENT AND TRADEMARK OFFICE
CERTIFICATE OF CORRECTION

PATENT NO. : 5,871,343
DATED : Feb 16, 1999
INVENTOR(S) : Baukal, Jr. et al.

It is certified that error appears in the above-identified patent and that said Letters Patent are hereby corrected as shown below:

Column 1, Line 12

Insert -- This invention was made with Government support under Contract No. DE-FC07-97ID13514 issued by the Department of Energy. The government has certain rights in this invention.--

Signed and Sealed this

Third Day of April, 2001

Attest:

NICHOLAS P. GODICI

Attesting Officer

Acting Director of the United States Patent and Trademark Office